US012128795B2

(12) United States Patent
Hasan et al.

(10) Patent No.: US 12,128,795 B2
(45) Date of Patent: Oct. 29, 2024

(54) METHODS AND SYSTEMS FOR SAFETY SEAT

(71) Applicant: BabyArk LTD, Hevel Modiln Industrial Park (IL)

(72) Inventors: Anan Hasan, Julis (IL); Shy Mindel, Hod-HaSharon (IL); Yury Antonov, Netanya (IL)

(73) Assignee: BabyArk LTD, Hevel Modiln Industrial Park (IL)

( * ) Notice: Subject to any disclaimer, the term of this patent is extended or adjusted under 35 U.S.C. 154(b) by 0 days.

(21) Appl. No.: 17/774,176

(22) PCT Filed: Nov. 4, 2020

(86) PCT No.: PCT/IL2020/051146
§ 371 (c)(1),
(2) Date: May 4, 2022

(87) PCT Pub. No.: WO2021/090315
PCT Pub. Date: May 14, 2021

(65) Prior Publication Data
US 2022/0371482 A1 Nov. 24, 2022

Related U.S. Application Data

(60) Provisional application No. 62/930,003, filed on Nov. 4, 2019.

(51) Int. Cl.
*B60N 2/28* (2006.01)
(52) U.S. Cl.
CPC ......... *B60N 2/2824* (2013.01); *B60N 2/2821* (2013.01); *B60N 2/2884* (2013.01)

(58) Field of Classification Search
CPC ... B60N 2/2824; B60N 2/2821; B60N 2/2884
See application file for complete search history.

(56) References Cited

U.S. PATENT DOCUMENTS

| D323,432 S | 1/1992 | Morton |
| D339,477 S | 9/1993 | Kain |

(Continued)

FOREIGN PATENT DOCUMENTS

| CN | 1976830 | 6/2007 |
| CN | 101786431 | 7/2010 |

(Continued)

OTHER PUBLICATIONS

Official Action Dated Jun. 1, 2023 from the US Patent and Trademark Office Re. U.S. Appl. No. 17/774,153. (22 pages).

(Continued)

*Primary Examiner* — David R Dunn
*Assistant Examiner* — Tania Abraham

(57) ABSTRACT

A safety seat for a vehicle that comprises a static part attachable to an anchor of a vehicle, at least two energy absorption elements mounted on the static part, each designed to absorb a different amount of energy and a dynamic part adapted to accommodate a child and comprising at least one connector which is engaging at least one of the at least two energy absorption elements, the at least one engaged energy absorption element is adapted to a weight range of a child, so as to absorb impact energy applied on the dynamic part via the static part, thus extending along a longitudinal movement between the static part and the dynamic part.

13 Claims, 10 Drawing Sheets

(56) References Cited

U.S. PATENT DOCUMENTS

| | | | |
|---|---|---|---|
| D366,965 S | 2/1996 | Meeker et al. | |
| D373,028 S | 8/1996 | Kain | |
| D374,558 S | 10/1996 | Kain | |
| D383,912 S | 9/1997 | Meeker et al. | |
| 5,685,603 A * | 11/1997 | Lane, Jr. | B60N 2/2821 297/252 |
| 6,012,007 A | 1/2000 | Fortune et al. | |
| D419,786 S | 2/2000 | Kain | |
| 6,206,470 B1 | 3/2001 | Baloga et al. | |
| D450,935 S | 11/2001 | Dranschak et al. | |
| 6,393,348 B1 | 5/2002 | Ziegler et al. | |
| 6,609,054 B2 | 8/2003 | Wallace | |
| D484,941 S | 1/2004 | Johnson | |
| D487,640 S | 3/2004 | Chen | |
| 6,808,200 B2 | 10/2004 | Drobny et al. | |
| 6,922,147 B1 | 7/2005 | Viksins et al. | |
| 7,024,294 B2 | 4/2006 | Sullivan et al. | |
| D524,560 S | 7/2006 | Berhow et al. | |
| 7,288,009 B2 | 10/2007 | Lawrence et al. | |
| D572,027 S | 7/2008 | Hui | |
| 7,439,866 B2 | 10/2008 | Wallner et al. | |
| 7,523,679 B2 | 4/2009 | Hawes et al. | |
| D604,054 S | 11/2009 | Biaud | |
| D621,171 S | 8/2010 | Xu | |
| D629,218 S | 12/2010 | Li | |
| D629,219 S | 12/2010 | Xu et al. | |
| D629,220 S | 12/2010 | Xu et al. | |
| D680,764 S | 4/2013 | Chen | |
| D683,974 S | 6/2013 | Leys et al. | |
| D697,323 S | 1/2014 | Williams et al. | |
| D702,052 S | 4/2014 | Wiegmann et al. | |
| 8,816,845 B2 | 8/2014 | Hoover et al. | |
| D737,061 S | 8/2015 | Daley et al. | |
| 9,132,754 B2 | 9/2015 | Mindel et al. | |
| D746,072 S | 12/2015 | Haley | |
| 9,266,535 B2 | 2/2016 | Schoenberg et al. | |
| D764,817 S | 8/2016 | Pos | |
| D771,987 S | 11/2016 | Daley et al. | |
| D778,627 S | 2/2017 | Stroikov | |
| D824,182 S | 7/2018 | Williams et al. | |
| 10,081,274 B2 | 9/2018 | Frank et al. | |
| D841,346 S | 2/2019 | Huntley et al. | |
| D851,948 S | 6/2019 | Imrich et al. | |
| D859,861 S | 9/2019 | Kapanzhi | |
| 10,723,245 B2 | 7/2020 | Anderson et al. | |
| 2002/0175544 A1 * | 11/2002 | Goor | B60N 2/2863 297/216.11 |
| 2004/0113797 A1 | 6/2004 | Osborne | |
| 2006/0273640 A1 | 12/2006 | Kassai et al. | |
| 2010/0253498 A1 | 10/2010 | Rork et al. | |
| 2012/0074758 A1 | 3/2012 | Gates et al. | |
| 2013/0088057 A1 | 4/2013 | Szakelyhidi et al. | |
| 2014/0239684 A1 | 8/2014 | Mindel et al. | |
| 2014/0253313 A1 | 9/2014 | Schoenberg | |
| 2014/0300155 A1 | 10/2014 | Lehman et al. | |
| 2014/0354021 A1 * | 12/2014 | Sedlack | B60N 2/2875 297/256.16 |
| 2017/0140634 A1 * | 5/2017 | Mindel | B60N 2/2863 |
| 2018/0099592 A1 | 4/2018 | Curry, V | |
| 2018/0232638 A1 | 8/2018 | Lin et al. | |
| 2018/0354443 A1 | 12/2018 | Ebrahimi et al. | |
| 2019/0176739 A1 | 6/2019 | Song | |
| 2019/0193590 A1 | 6/2019 | Labombarda et al. | |
| 2019/0251820 A1 | 8/2019 | Friedman | |
| 2021/0078461 A1 | 3/2021 | Ma et al. | |
| 2022/0363168 A1 | 11/2022 | Hasan et al. | |
| 2022/0371483 A1 | 11/2022 | Hasan et al. | |
| 2022/0402452 A1 | 12/2022 | Hasan et al. | |

FOREIGN PATENT DOCUMENTS

| | | |
|---|---|---|
| CN | 102015364 | 4/2011 |
| CN | 102189946 | 9/2011 |
| CN | 103042954 | 4/2013 |
| CN | 103879316 | 6/2014 |
| CN | 104024042 | 9/2014 |
| CN | 204327674 | 5/2015 |
| CN | 105620321 | 6/2016 |
| CN | 106627285 | 5/2017 |
| CN | 107662527 | 2/2018 |
| CN | 208498316 | 2/2019 |
| CN | 208576460 | 3/2019 |
| CN | 110116661 | 8/2019 |
| CN | 110126687 | 8/2019 |
| DE | 4446595 | 10/1995 |
| DE | 102008027829 | 12/2009 |
| DE | 102017126431 | 5/2019 |
| EP | 2269861 | 1/2011 |
| EP | 2746097 | 6/2014 |
| GB | 2490414 | 10/2012 |
| JP | 2009-274492 | 11/2009 |
| JP | 2010-284992 | 12/2010 |
| WO | WO 2013/046200 | 4/2013 |
| WO | WO 2017/029272 | 2/2017 |
| WO | WO 2019/091916 | 5/2019 |
| WO | WO 2021/090313 | 5/2021 |
| WO | WO 2021/090315 | 5/2021 |
| WO | WO 2021/090316 | 5/2021 |
| WO | WO 2021/090318 | 5/2021 |
| WO | WO 2018/054249 | 8/2021 |

OTHER PUBLICATIONS

International Preliminary Report on Patentability Dated May 19, 2022 From the International Bureau of WIPO Re. Application No. PCT/IL2020/051142. (10 Pages).

International Preliminary Report on Patentability Dated May 19, 2022 From the International Bureau of WIPO Re. Application No. PCT/IL2020/051146. (8 Pages).

International Preliminary Report on Patentability Dated May 19, 2022 From the International Bureau of WIPO Re. Application No. PCT/IL2020/051147. (10 Pages).

International Preliminary Report on Patentability Dated May 19, 2022 From the International Bureau of WIPO Re. Application No. PCT/IL2020/051149. (10 Pages).

International Search Report and the Written Opinion Dated Feb. 7, 2021 From the International Searching Authority Re. Application No. PCT/IL2020/051146. (10 Pages).

International Search Report and the Written Opinion Dated Apr. 12, 2021 From the International Searching Authority Re. Application No. PCT/IL2020/051142. (16 Pages).

International Search Report and the Written Opinion Dated Feb. 17, 2021 From the International Searching Authority Re. Application No. PCT/IL2020/051149. (17 Pages).

International Search Report and the Written Opinion Dated Mar. 25, 2021 From the International Searching Authority Re. Application No. PCT/IL2020/051147. (11 Pages).

Invitation to Pay Additional Fees and Communication Relating to the Results of the Partial International Search Dated Feb. 23, 2021 From the International Searching Authority Re. Application No. PCT/IL2020/051142. (4 Pages).

Notice of Allowability Dated Jul. 8, 2021 from the US Patent and Trademark Office Re. U.S. Appl. No. 29/713,766. (4 pages).

Notice of Allowance Dated Oct. 22, 2021 from the US Patent and Trademark Office Re. U.S. Appl. No. 29/712,626. (27 pages).

Notice of Allowance Dated Apr. 23, 2021 from the US Patent and Trademark Office Re. U.S. Appl. No. 29/716,766. (19 pages).

Technical Requirement Dated Sep. 7, 2020 From the Servico Publico Federal, Ministerio da Economia, Instituto Nacional da Propriedade Industrial do Brasil Re. Application No. BR302020002169-0 and Its Translation Into English. (16 Pages).

BeSafe "BeSafe iZi Modular i-Size Installation", BeSafe—Scandinavian Safety, Screen Capture From YouTube Video Clip, 1 P., Feb. 9, 2016.

BeSafe "iZi Modular™ i-Size—User Manual", BeSafe® Scandinavian Safety, UN Regulation No. R129, p. 1-98, May 18, 2017.

BeSafe "SIP+—Additional Side Impact Protection", BeSafe® Scandinavian Safety, p. 1-4, 2019.

(56) References Cited

OTHER PUBLICATIONS

BeSafe "Toddler Car Seat—iZi Modular i-Size Concept", BeSafe® Scandinavian Safety, Product Description, p. 1-7, 2019.
Britax "Britax Roemer BABY-SAFE i-SIZE Review", Pushchair Expert, Product Description, p. 1-10, Dec. 21, 2016.
Jollyroom "CYBEX Sirona M2 i-Size Instructionvideo", Screen Capture From YouTube Video Clip, 1 P., Mar. 23, 2017.
Maxi-Cosi "Maxi-Cosi—How to Install the AxissFix Car Seat in Your Car", Screen Capture From YouTube Video Clip, 1 P., Dec. 12, 2014.
Maxi-Cosi "The New Pebble Plus", Screen Capture From YouTube Video Clip, 1 P., Oct. 10, 2014.
Smyths Toys Superstore "Smyth Toys—Doona ISOfix Base Black", Screen Capture From YouTube Video Clip, 1 P., Apr. 14, 2017.
Notification of Office Action and Search Report Dated Jan. 22, 2024 From the State Intellectual Property Office of the People's Republic of China Re. Application No. 202080091573.3 and its Machine Translation of Office Action Into English as well as an English summary. ( 17 Pages).
Restriction Official Action Dated Jan. 25, 2024 from the US Patent and Trademark Office Re. U.S. Appl. No. 17/774,172. (6 pages).
Restriction Official Action Dated Apr. 26, 2024 from the US Patent and Trademark Office Re. U.S. Appl. No. 17/774,181. (6 pages).
Supplementary European Search Report and the European Search Opinion Dated May 15, 2024 From the European Patent Office Re. Application No. 20885873.8. (13 Pages).
Notice of Allowance Dated Nov. 20, 2023 from the US Patent and Trademark Office Re. U.S. Appl. No. 17/774,153. (3 pages).
Supplementary European Search Report and the European Search Opinion Dated Nov. 17, 2023 From the European Patent Office Re. Application No. 20885648.4. (7 Pages).
Supplementary European Search Report and the European Search Opinion Dated Nov. 15, 2023 From the European Patent Office Re. Application No. 20885576.7. (10 Pages).
English Summary Dated Feb. 27, 2024 of Notification of Office Action Dated Feb. 8, 2024 From the National Intellectual Property Administration of the People's Republic of China Re. Application No. 202080091578.6. (2 Pages).
Machine Translation Dated Feb. 22, 2024 of Notification of Office Action and Search Report Dated Feb. 8, 2024 From the National Intellectual Property Administration of the People's Republic of China Re. Application No. 202080091578.6. (10 Pages).
Notification of Office Action and Search Report Dated Feb. 8, 2024 From the National Intellectual Property Administration of the People's Republic of China Re. Application No. 202080091578.6. (9 Pages).
Supplementary European Search Report and the European Search Opinion Dated Dec. 13, 2023 From the European Patent Office Re. Application No. 20884278.1. (8 Pages).
Supplementary Partial European Search Report and the European Provisional Opinion Dated Dec. 5, 2023 From the European Patent Office Re. Application No. 20885873.8. (12 Pages).
Notification of Office Action and Search Report Dated Feb. 27, 2024 From the State Intellectual Property Office of the People's Republic of China Re. Application No. 202080091585.6 and its Machine Translation Into English. (27 Pages).
Notification of Office Action Dated Jul. 16, 2024 From the State Intellectual Property Office of the People's Republic of China Re. Application No. 202080091585.6. (4 Pages).
Official Action Dated Aug. 29, 2024 from the US Patent and Trademark Office Re. U.S. Appl. No. 17/774,172. (44 pages).
Translation and Summary Dated Jul. 29, 2024 of Notification of Office Action Dated Jul. 16, 2024 From the State Intellectual Property Office of the People's Republic of China Re. Application No. 202080091585.6. (4 Pages).

\* cited by examiner

METHODS AND SYSTEMS FOR SAFETY SEAT

RELATED APPLICATIONS

This application is a National Phase of PCT Patent Application No. PCT/IL2020/051146 having International filing date of Nov. 4, 2020, which claims the benefit of priority under 35 USC § 119(e) of U.S. Provisional Patent Application No. 62/930,003 filed on Nov. 4, 2019.

PCT Patent Application No. PCT/IL2020/051146 is also related to co-filed PCT Patent Application No. PCT/IL2020/051147 entitled "METHODS AND SYSTEMS FOR GENERATING TRAINING AND EXECUTING A MODEL FOR DETECTING SAFETY SEAT EVENTS".

The contents of the above applications are all incorporated by reference as if fully set forth herein in their entirety.

FIELD AND BACKGROUND OF THE INVENTION

The present invention, in some embodiments thereof, relates to a safety seat for a vehicle and, more particularly, but not exclusively, to mechanisms for improving safety and usability of a child safety seat.

Existing safety seats include energy absorption elements, which are protecting the passenger at a time of impact. The energy absorption elements are designed based on expected mass of the passenger and expected speed of the vehicle during an accident.

SUMMARY OF THE INVENTION

According to some embodiments of the present invention there is provided a safety seat for a vehicle. The safety seat, comprises a static part attachable to an anchor of a vehicle, at least two energy absorption elements mounted on the static part, each designed to absorb a different amount of energy and a dynamic part adapted to accommodate a child and comprising at least one connector which is engaging at least one of the at least two energy absorption elements, the at least one engaged energy absorption element is adapted to a weight range of a child, so as to absorb impact energy applied on the dynamic part via the static part, thus extending along a longitudinal movement between the static part and the dynamic part.

Optionally, the static part and the dynamic part are included in a seat base, and a seat frame concavely shaped to accommodate a child is detachably connected to the dynamic part.

Optionally, the static part is comprising a seat base and the dynamic part includes a seat frame concavely shaped to accommodate a child, wherein the seat frame is detachably connected to the seat base.

More optionally, the seat frame comprises the at least one connector and the seat frame is detachably connected to the seat base via the at least one connector.

Optionally, the at least one connector includes at least one pin which is inserted into at least one hole of the at least one selected energy absorption element.

Optionally, the at least two energy absorption elements include a deformable element.

Optionally, the longitudinal movement between the static part and the dynamic part is directed by a longitudinal track connecting the static part and the dynamic part.

More optionally, the safety seat of claim 1 further comprises at least one of an accelerometer and a gyroscope for detecting an impact on the safety seat.

Optionally, each of the at least two energy absorption elements is designed to absorb energy by non-elastic extension along an axis.

According to some embodiments of the present invention there is provided a method for selecting energy absorption elements of a safety seat for a vehicle. The method comprises connecting a seat frame concavely shaped to accommodate a child to a seat base attached to an anchor of a vehicle, the seat base includes at least two energy absorption elements, each having mechanical properties designed to absorb different amount of energy and engaging at least one selected energy absorption element of the at least two energy absorption elements by at least one connector included in the seat frame based on a weight of the child, so the at least one selected energy absorption element is absorbing impact energy applied on the seat frame via the seat base.

According to some embodiments of the present invention there is provided a safety seat base for a vehicle. The safety seat base, comprises a static part attachable to an anchor of a vehicle, a dynamic part which is detachably connected to a seat frame, the seat frame is concavely shaped to accommodate a child and one or more energy absorption elements connecting between the static part and the dynamic part. The energy absorption element is extended a long an axis when absorbing impact energy, thus creating a gap between the static part and the dynamic part which is providing indication of the deformation.

Optionally, the gap is visible to a user.

Optionally, an inner part of the gap is marked by color to provide noticeable indication.

Optionally, the gap is detected by a sensor.

According to some embodiments of the present invention there is provided a safety seat for a vehicle. The safety seat comprises a static part attachable to an anchor of a vehicle, an energy absorption elements mounted on the static part and designed to absorb energy by non-elastic extension along an axis, and a dynamic part adapted to accommodate a child and comprising at least one connector which is engaging at least one energy absorption element sized and shaped to absorb impact of energy applied on the dynamic part via the static part by the non-elastic extension along the axis, limiting a longitudinal movement of the dynamic part along the axis.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1A:
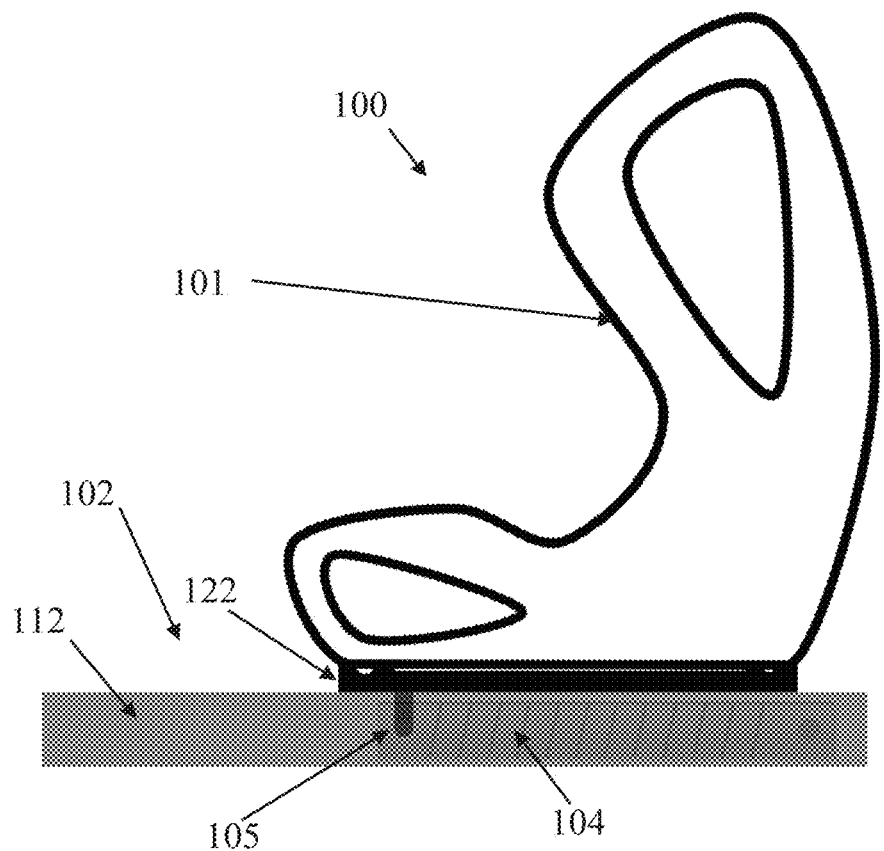
FIG. 1A is a schematic illustration of an infant safety seat for a vehicle, according to some embodiments of the present invention.

The present invention, in some embodiments thereof, relates to a safety seat for a vehicle and, more particularly, but not exclusively, to mechanisms for improving safety and usability of a child safety seat.

One of the challenges in energy adsorption is to have an optimized fit between the energy absorption element and the energy it needs to absorb. In a car seat product, the main parameters of the energy are the car's speed at an accident and the passenger's mass. To reduce the amount of variables, and adaptive energy absorption element is needed. While the accident speed is unknown, seat weight is known, and the passenger's weight may be estimated.

According to some embodiments of the present invention, there is provided a safety seat, for example for an infant or child, but could also be for an adult person. The safety seat includes several energy absorption elements, wherein one or more of the energy absorption elements are selected to be engaged. The selected engaged energy absorption element(s) are mechanically connecting between a static part of the safety seat (attached to a seat of the vehicle, and therefore static relative to the vehicle) and a dynamic part which is carrying the child. During front impact to the vehicle, the selected engaged energy absorption element(s) are absorbing impact energy applied on the dynamic part via the static part, thus creating longitudinal movement between the static part and the dynamic part. The energy absorption element(s) are selected so as to transfer energy at a desired strength from the static part to the dynamic part. When the suitable energy absorption element is selected, movement is created between the parts which does not exceed the dynamic range of the movement. Optionally, the energy absorption elements are selected according to the type of seat frame that is mounted on the dynamic part.

According to some embodiments of the present invention, there is provided a seat base which includes a static part attachable to an anchor of a vehicle and a dynamic part detachably connected to a seat frame. The static part and the dynamic part are connected by one or more energy absorption element. During an accident, the energy absorption element is deformed, and a gap is created between the static part and the dynamic part. The gap is used as an indicator for a user that one or more parts of the seat base are no longer safe to use and need to be replaced.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1B:
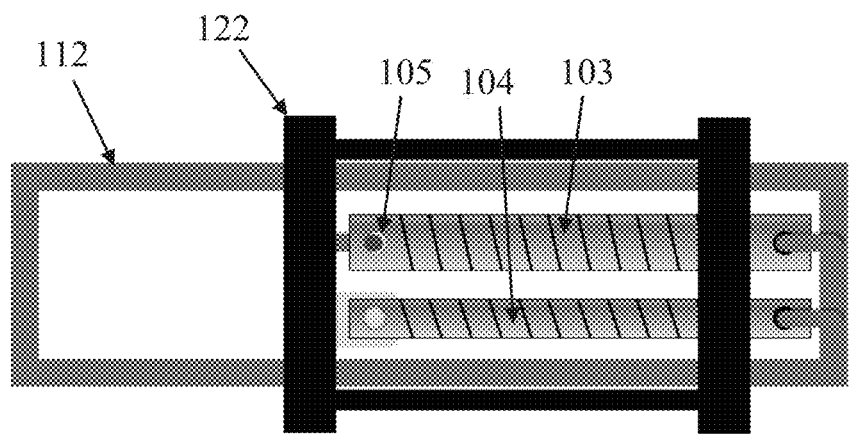
FIG. 1B is a schematic illustration of seat base of the safety of FIG. 1A, according to some embodiments of the present invention.

Referring now to the drawings, FIG. 1A is a schematic illustration of an infant safety seat for a vehicle, according to some embodiments of the present invention. Reference is also made to FIG. 1B, which is a schematic illustration of seat base of the safety of FIG. 1A, according to some embodiments of the present invention.

The safety seat 100 includes a seat frame 101, which is concavely shaped to accommodate an infant. Other embodiments may include a rigid frame which is shaped to accommodate a child or even an adult. The seat frame 101 may be made of a rigid material, for example plastic, steel and/or carbon fibers, so it does not break or deform on impact.

The safety seat 100 also includes a seat base 102. The seat base 102 is attachable to an anchor of a vehicle, for example by latches such as Isofix standard latches. The seat frame 101 is detachably connected to the seat base 102. The seat base 102 includes a static part 112 and a dynamic part 122. The seat frame 101 is connected to an interface on the dynamic part 122, the interface may include for example a connector which may be opened and closed by a user for attaching or detaching the seat frame 101. The static part 112 is attachable to an anchor of a vehicle. Longitudinal movement between the static part 112 and the dynamic part 122 may be directed by a longitudinal track connecting the static part 112 and the dynamic part 122.

During a front impact to the vehicle, the static part stays attached to the vehicle frame, and therefore static relative to the vehicle. The dynamic part may be moved forward relative to the static part while the energy absorption element(s) are deformed to absorb energy. Optionally, the energy absorption element is a metallic helical element subjected to torsion about a helical axis. The material is subjected to a bending moment. In such embodiments, the deformation caused by an accident impact is a permanent non-elastic extension along an axis, for example the helical axis which is a longitudinal axis of the metallic helical element for instance an axis parallel to the longitudinal track connecting the static part 112 and the dynamic part 122. The permanent, non-elastic extension of material, for instance steel, is caused by tensile loads exceeding a yield point of the material of the energy absorption element. The deformation load continues until the load decreases or until it exceeds a limit of proportionality. This reduces the energy transferred to the static part and the seat in case of an accident. The permanent non-elastic extension changes the length of the energy absorption element and therefore a location of the static part 112 in relation to the dynamic part 122, for example the breath of a gap forming in an area defined by a part of the static part 112 and a part of the dynamic part 122.

The seat base 102 includes at least one or more energy absorption elements, for example at least two energy absorption elements 103 and 104 mounted on the seat base 102, each having mechanical properties designed to absorb different amount of energy. In one example each of the two or more energy absorption elements are helical elements adapted to the absorb energy in accordance to different weights or ages, allowing the user to connect a helical element suitable for the child while disconnect the others. The suitable helical element may be connected by a user decision (e.g. one helical element will be connected for an infant and two for a grown child). The suitable helical element may be connected by an electronic connector engagement mechanism that includes digital scales for measuring a weight of a child sited in the chair, a controller for selecting the suitable helical element based on weight measurements of the scales, and actuator(s) for connecting the suitable helical element while disconnecting the other helical elements and/or by adding a number of helical elements based on the weight of the child. The suitable helical element may be connected by an electronic connector engagement mechanism that includes a controller for selecting the suitable helical element based on a location and/or position of the chair in the vehicle, and actuator(s) for connecting the suitable helical element while disconnecting the other helical elements and/or by adding a number of helical elements based on the location and/or position of the child. For example, when the chair is in a forward facing position two helical elements are connected whereas when the chair is in a rear facing position only one is engaged. Optionally, a set of absorption elements is provided with the infant safely seat, allowing a user or an electronic connector engagement mechanism to replace the absorption element which mechanically connects between the static and dynamic parts.

Optionally, when the energy absorption element is a spiral tube, the size of the spiral, material and wall thickness may be designed according to the amount of energy that the element needs to handle. The energy absorption elements 103 and 105 are connecting between the static part 112 and the dynamic part 122 of seat base 102. Multiple energy absorption elements may be mounted on the seat base 102, for example, 2, 3, 4 and or any other number of energy absorption elements. Optionally, the energy absorption elements are positioned in parallel to each other, and longitudinally to the vehicle.

The energy absorption elements 103 and/or 104 may be a plastically deformable absorbing element, for example an elongated spiral, a crushable column, a rolling torus, an inversion tube, a cutting shock absorber, a slitting shock absorber, a tube-and-die absorber, a rolling absorber, a flattening-tube absorber, a strap bender absorber, a rod bender absorber, a wire bender absorber, a wire-through-platen absorber, a deformable link absorber, an elongating a tube/strap/cable absorber, a tube flaring, a housed coiled cable absorber, a bar-through-die absorber, a hydraulic absorber, a pneumatic absorber and/or any other absorber or combinations thereof. The energy absorption elements 103 and/or 104 may be deformable a manner that changes their static state, meaning that they are non-elastic. The shape of such an energy absorption element is changed when energy is absorbed, and does not spontaneously returning to its original shape.

Figure 2A:
FIGS. 2A and 2B, which are illustrations of an exemplary elongated spiral energy absorption element, before and after and impact, respectively, according to some embodiments of the present invention.
Figure 2B:
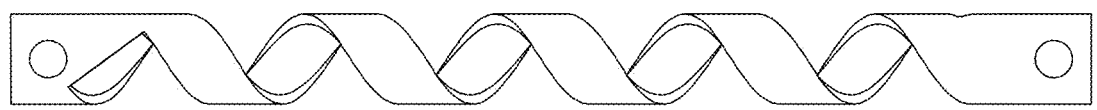

Reference is now made to FIGS. 2A and 2B, which are illustrations of an exemplary elongated spiral energy absorption element, before and after and impact, respectively, according to some embodiments of the present invention. During an impact, the absorbing element is plastically deformed, so the spiral is opened. The energy absorption element may be permanently deformed, may be deformed in an irreversible manner or deformed in a manner that is irreversible without welding and/or using fixture for bending metal.

The safety seat 100 includes at least one connector 105 for engaging at least one selected energy absorption element of the at least two energy absorption elements, so the at least one selected energy absorption element is absorbing impact energy applied on the seat frame via the seat base. The at least one selected energy absorption element is selected based on the weight of the child. The connector 105 is facilitating a detachable connection which is adapted to be mechanically connected and disconnected from a respective connector of the energy absorption element without welding or adhesive. The connector 105 may be, for example a pin which is inserted into one of the holes of the selected energy absorption element 103 or 104. The connector 105 may also be a button, a clip, a hook, a ring and/or any other connector.

The connector(s) 105 may be included in the dynamic part 122 of seat base 102, so the seat frame 101 is detachably connected to the dynamic part 122. Alternatively, the connector(s) 105 may be included in seat frame 101, so that the connector(s) 105 are connecting the seat frame 101 to the seat base 102.

Multiple seat frames may be available for attaching to seat base 102, each designed for an infant of a different weight, and each is suitable for attaching different connectors to different one(s) of the energy absorption elements 103 and/or 104. For example, the seat base 102 may be able to connect to two seat frames: one seat frame, such as a carry cot, dedicated for infants of ages 0-~12 months (resulting in low weight, since the combined infant and seat's weight is low), and another seat frame which is a convertible seat dedicated for children of ages 0-5 years (resulting in high weight, since the child may have high mass and the convertible seat itself has a high mass). The first seat frame may be suitable for connecting energy absorption elements 103, while the second seat frame is suitable for connecting energy absorption elements 104. Alternatively, the first seat frame may be suitable for connecting only energy absorption elements 103, while the second seat frame is suitable for connecting both energy absorption elements 103 and 104. For another example, the seat base 102 may be able to connect to a rear facing seat, suitable for connecting one energy absorption element, and multiple different front facing seats suitable for connecting two energy absorption element.

The connectors may be connected to the suitable energy absorption elements according to instructions related to the specific seat frame, or may be mechanically connected by the attachment of the seat frame to the seat base, for example by nobs included in the seat frame which are pushing the connectors.

Figure 3A:
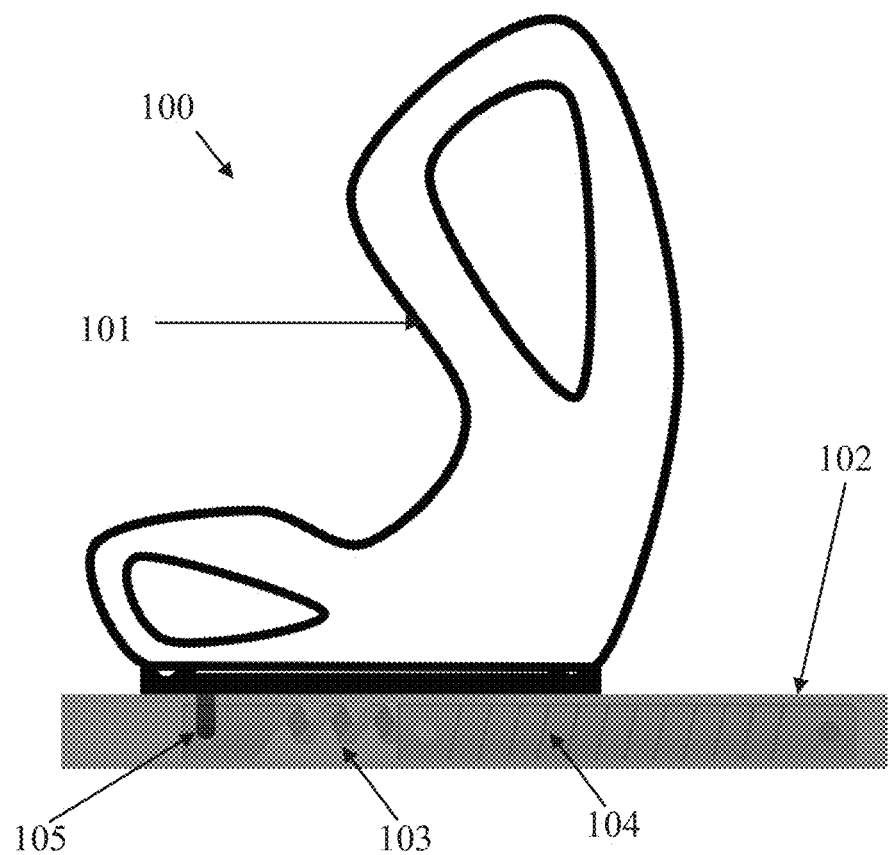
FIG. 3A is a schematic illustration of an infant safety seat for a vehicle after impact, according to some embodiments of the present invention.
Figure 3B:
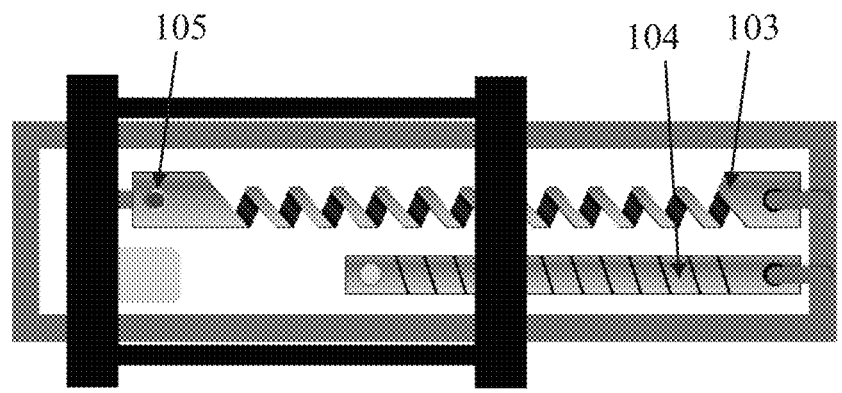
FIG. 3B is a schematic illustration of seat base of the safety of FIG. 1A after impact, according to some embodiments of the present invention.

Reference is now made to FIG. 3A, which is a schematic illustration of an infant safety seat for a vehicle after impact, according to some embodiments of the present invention. Reference is also made to FIG. 3B, which is a schematic illustration of seat base of the safety of FIG. 1A after impact, according to some embodiments of the present invention. The selected energy absorption element 103 is deformed after absorbing the energy of the impact, while the energy absorption element 104, which is not engaged, is not deformed.

Figure 4:
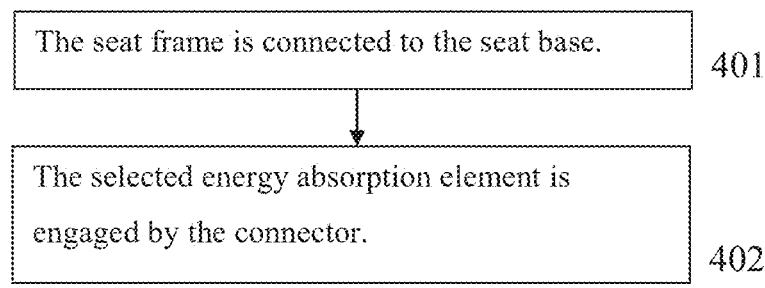
FIG. 4 is a flowchart schematically representing a method for selecting energy absorption elements of a safety seat for a vehicle, according to some embodiments of the present invention.

Reference is now made to FIG. 4, which is a flowchart schematically representing a method for selecting energy absorption elements of a safety seat for a vehicle, according to some embodiments of the present invention.

First, as shown at 401, the seat frame 101 is connected to the seat base 102, as described above.

Then, as shown at 402, at least one selected energy absorption element 103 is engaged by at least one connector 105, as described above.

Figure 5A:
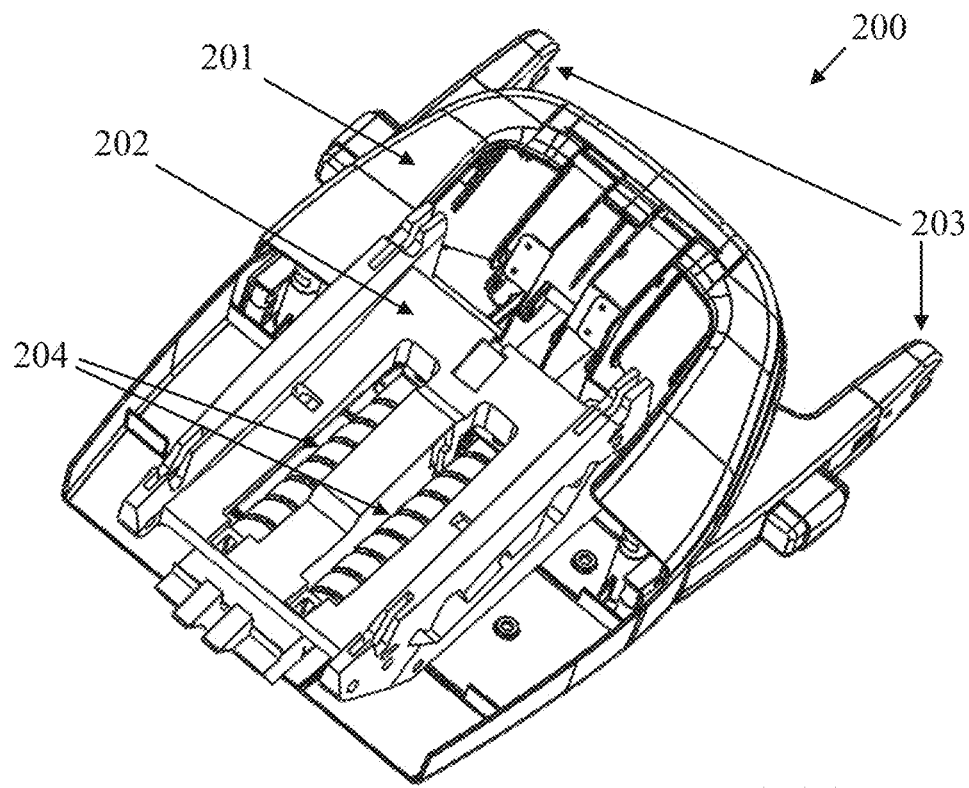
FIGS. 5A and 5B are illustrations of an exemplary seat base, before and after front impact, respectively, according to some embodiments of the present invention.
Figure 5B:
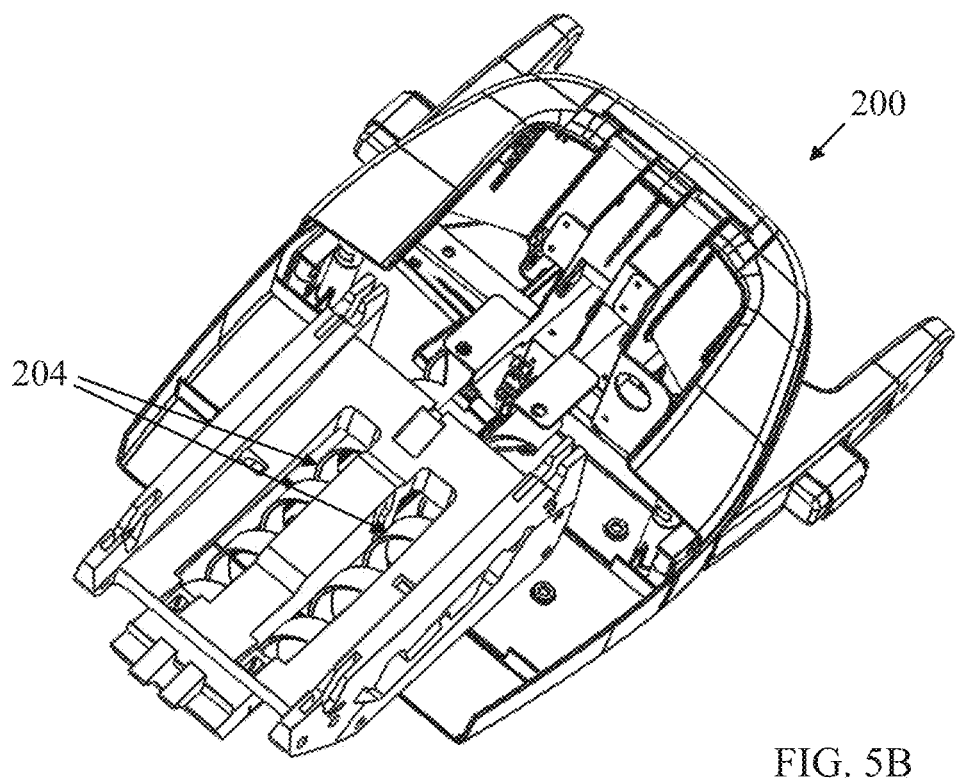
Figure 6A:
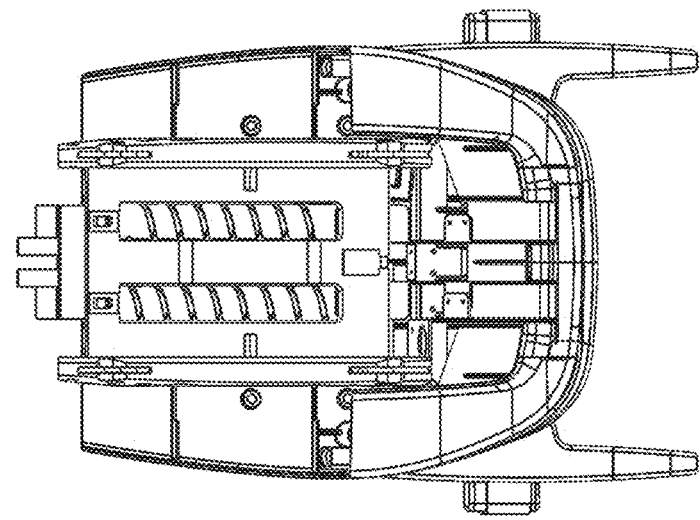
FIGS. 6A and 6B are top view illustrations of the exemplary seat base of FIGS. 5A and 5B, respectively, according to some embodiments of the present invention.
Figure 6B:
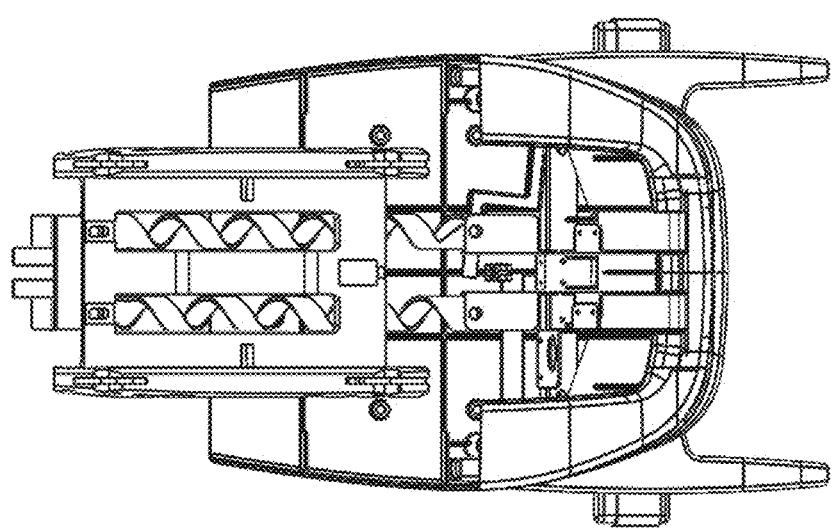

Reference is now also made to FIGS. 5A and 5B, which are illustrations of an exemplary seat base, before and after front impact, respectively, according to some embodiments of the present invention. Reference is also made to FIGS. 6A and 6B, which are top view illustrations of the exemplary seat base of FIGS. 5A and 5B, respectively, according to some embodiments of the present invention. The seat base 200 includes a static part 201 and a dynamic part 202. The static part 201 is located at the back and bottom side of seat base 200, and is attachable, at the bottom back to an anchor of a vehicle by connectors 203. The dynamic part 202 is located on top of the static part 201 on the front side. A seat frame may be connected to dynamic part 202, as described above. In this example, both energy absorption elements 204 are engaged. During a front impact to the vehicle, the static part 201 stays attached to the vehicle seat, and therefore static relative to the vehicle. The dynamic part 202 may be moved forward relative to the static part 201—the energy absorption elements 203 are deformed instead of pulling the dynamic part 202 (with the child seating inside the seat frame) together with static part 201 and the vehicle.

Figure 7A:
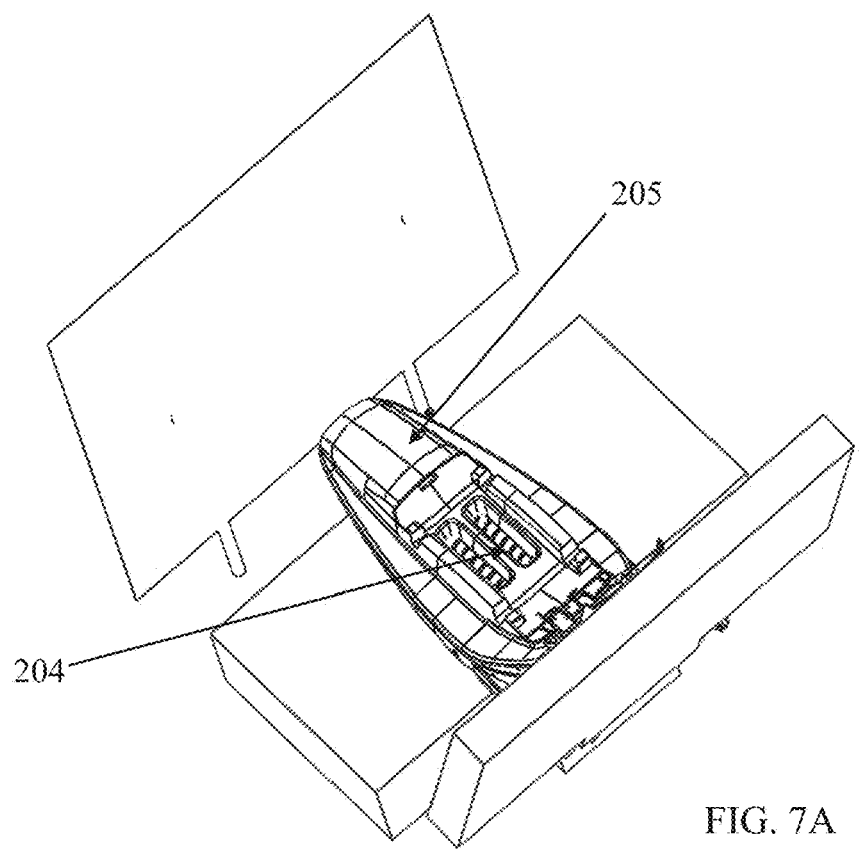
FIGS. 7A and 7B are illustrations of the exemplary seat base of FIGS. 5A and 5B, respectively, including base covers, according to some embodiments of the present invention.
Figure 7B:
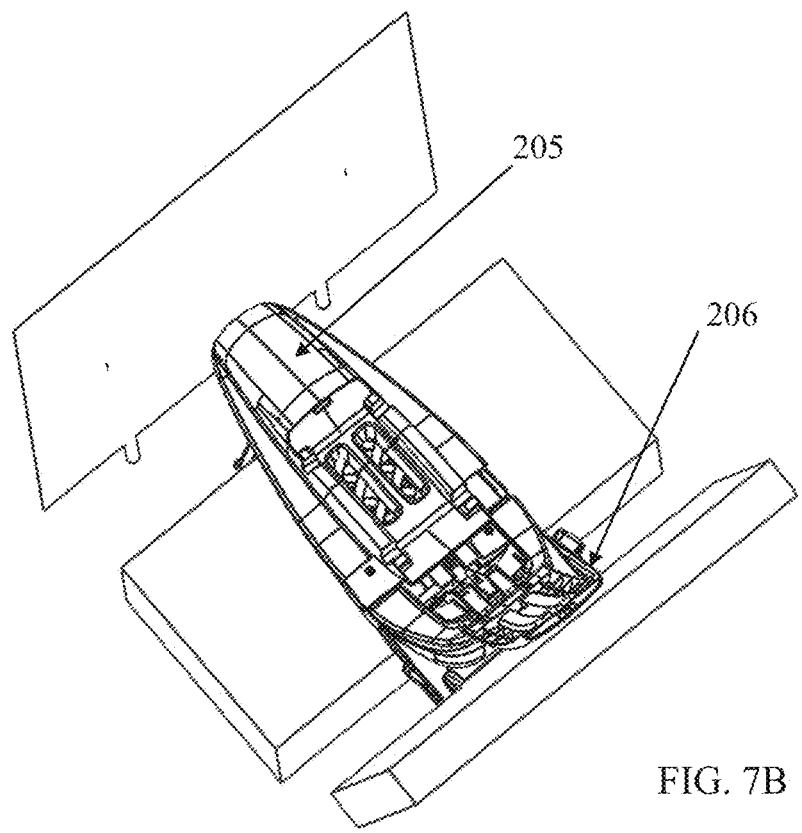
Figure 8A:
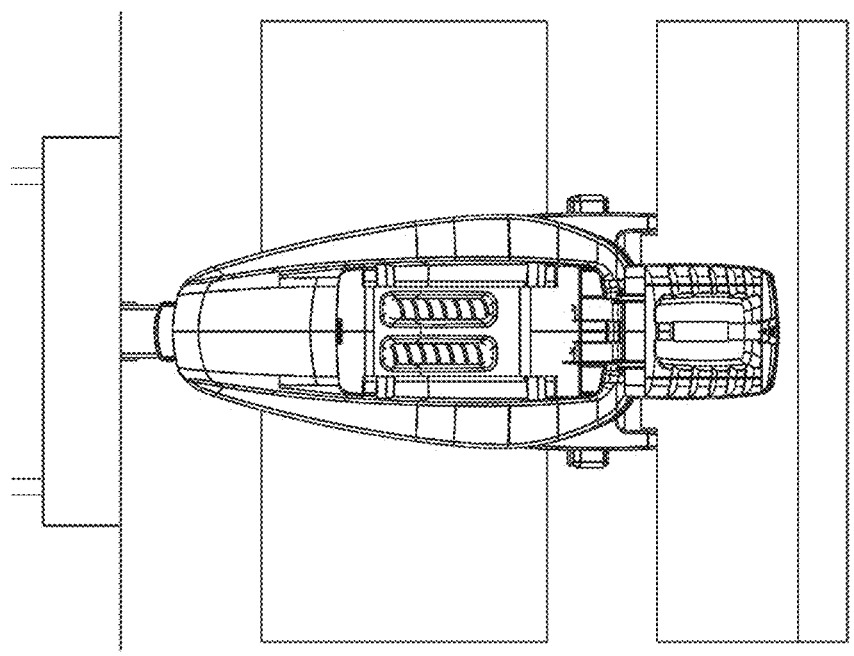
FIGS. 8A and 8B are top view illustrations of the exemplary seat base of FIGS. 7A and 7B, respectively, according to some embodiments of the present invention.
Figure 8B:
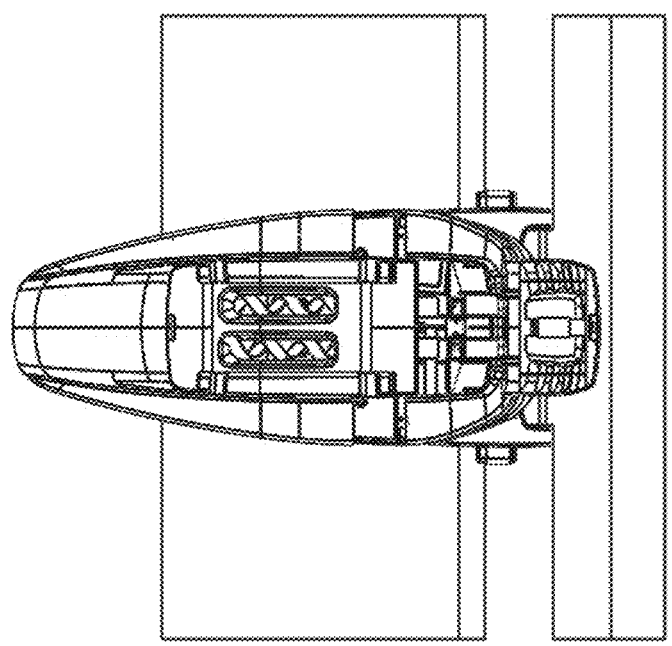

Reference is now made to FIGS. 7A and 7B, which are illustrations of the exemplary seat base of FIGS. 5A and 5B, respectively, including base covers, according to some embodiments of the present invention. The seat base 200 is shown as it is installed on a car seat. Front cover 205 is attached to dynamic part 202, while top cover 206 is attached to static part 201. Top cover 206 is shown open, and may also be closed to cover the energy absorption elements 204 when the seat base 200 is not installed in the vehicle or when the child seat (not shown in the illustration) is not installed on the base. Reference is also made to FIGS. 8A and 8B, which are top view illustrations of the exemplary seat base of FIGS. 7A and 7B, respectively, according to some embodiments of the present invention.

Figure 9A:
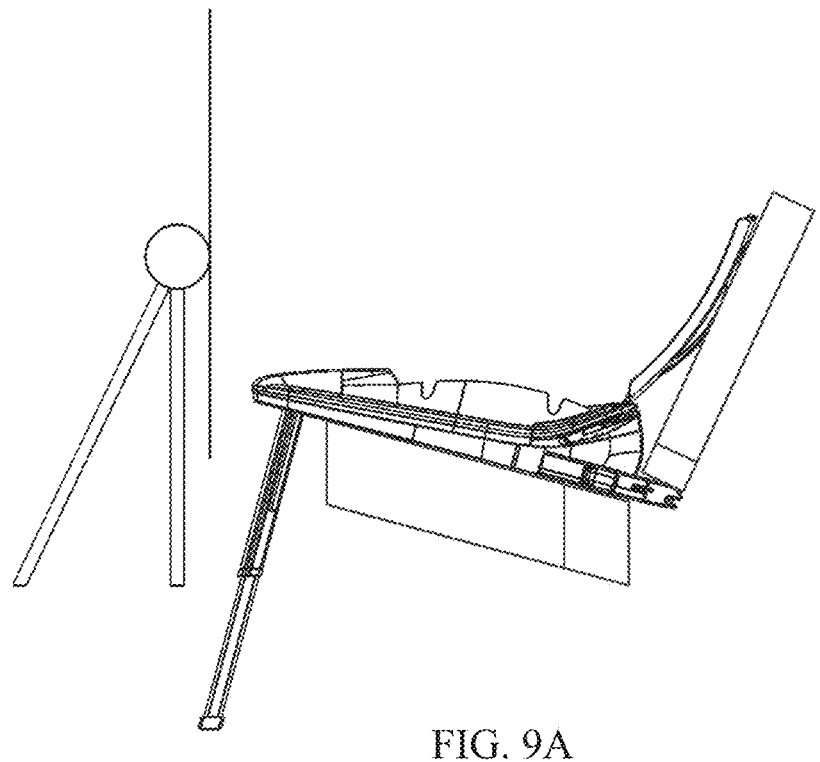
FIGS. 9A and 9B are side view illustrations of the exemplary seat base of FIGS. 7A and 7B, respectively, according to some embodiments of the present invention.
Figure 9B:
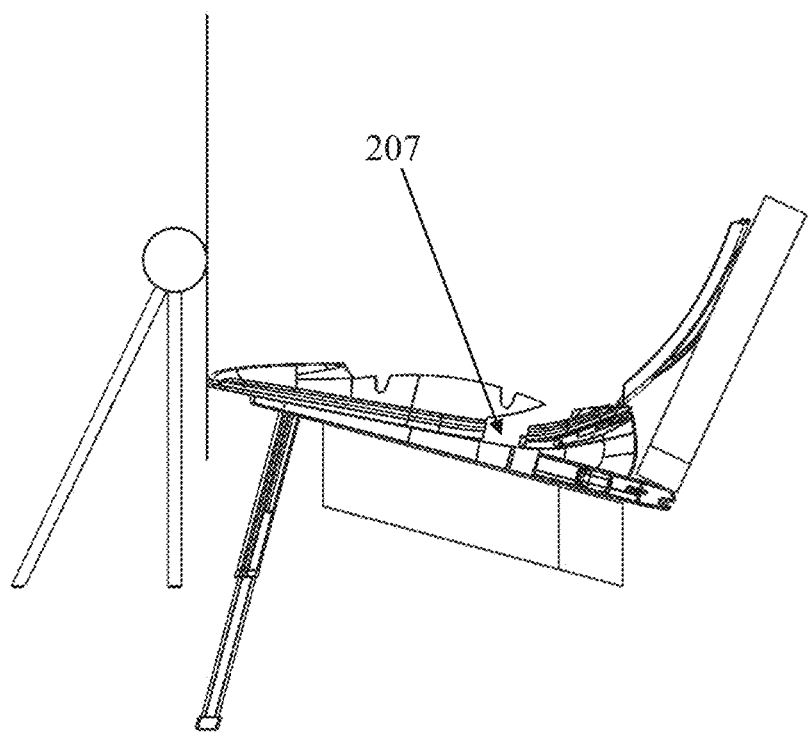
Figure 10A:
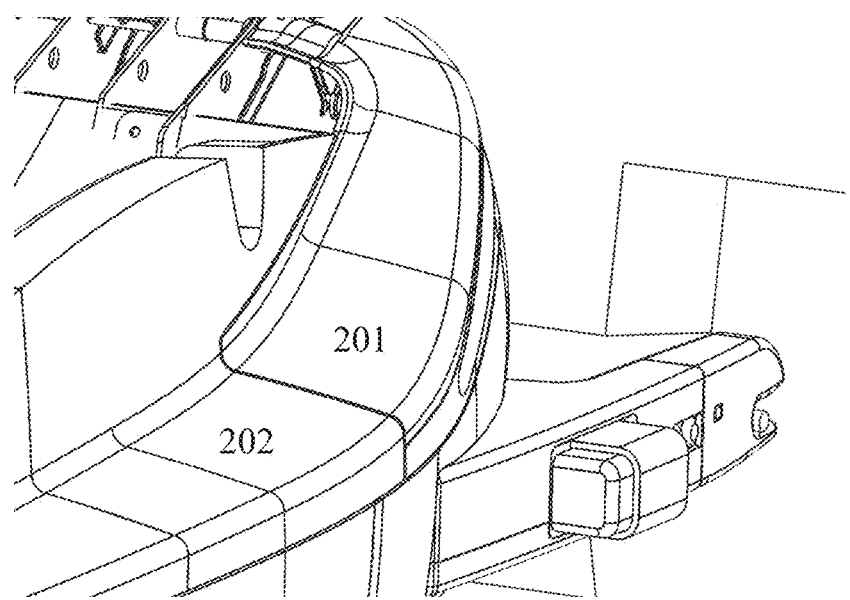
FIGS. 10A and 10B are enlarged view illustrations of the exemplary seat base of FIGS. 7A and 7B, respectively, according to some embodiments of the present invention.
Figure 10B:
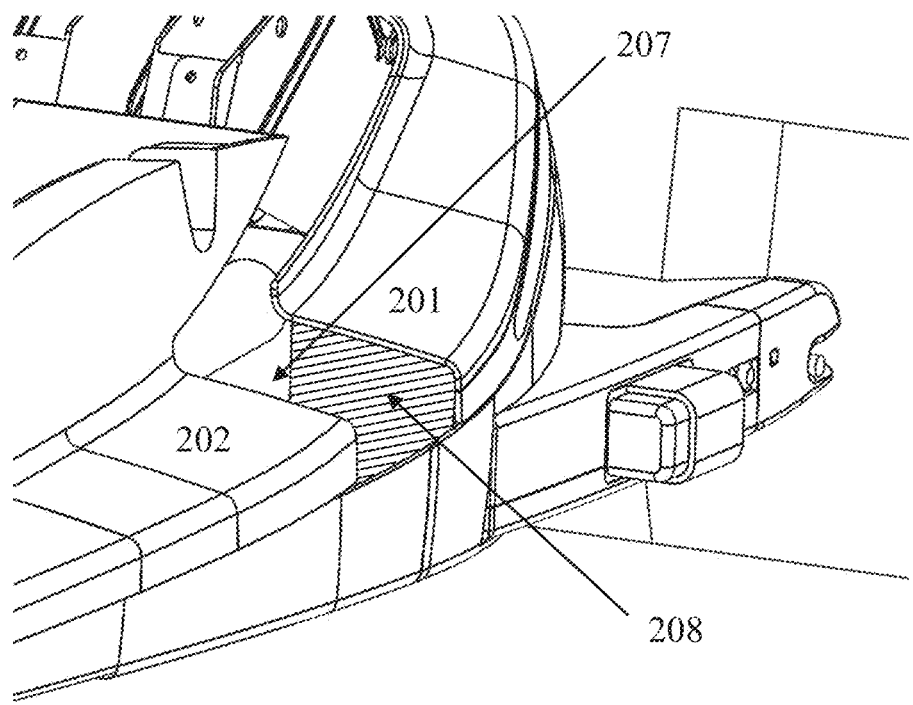

Optionally, a gap is opened between the static part 201 and the dynamic part 202 of seat base 200, during a front impact. Reference is made to FIGS. 9A and 9B, which are side view illustrations of the exemplary seat base of FIGS. 7A and 7B, respectively, according to some embodiments of the present invention. Reference is also made to FIGS. 10A and 10B, which are enlarged view illustrations of the exemplary seat base of FIGS. 7A and 7B, respectively, according to some embodiments of the present invention. A gap 207 is shown at FIG. 9B and FIG. 10B. The gap 207 is visible, therefore indicating that the energy absorption elements 204 are deformed, and should be replaced.

Optionally, an inner part of the gap 207, such as a panel 208, is colored differently than the outer parts of the seat base and/or otherwise visibly marked. After a front impact, the panel 208 is revealed through the gap 207, providing a highly visible indication. Optionally, the gap 207 is detected by a sensor, for example a hall sensor and a magnet, a micro-switch, a fuse and/or any other sensor. The hall sensor may be located, for example, on one side of the gap 207, while a magnet is located on the other side of the gap 207. The sensor may then provide indication to a user, for example by an interface of an electronic device, by light or sound indicator and/or by any other method.

Optionally, the safety seat includes an accelerometer and/or a gyroscope for detecting an impact on the safety seat (on any part of a seat base and/or a seat frame).

The sensors may provide accurate data, at any point of time, of the amount for G force and its vector on the safety seat. The data may be used in different ways, helping to keep the child and parents safe. For example, in a case of identification of an accident, an automatic call may be made to emergency services, indicating the car's location. For another example, the sensors may provide information that the seat has been in an accident and needs to be replaced with a new seat. For example, a notification may be made to the user when an acceleration of 6G or more is detected, and replacement of one or more part of the safety seat is needed or any other scenario decided by the manufacturer that is an abnormal situation requires notification. Optionally, data collected from the sensors is combined with data collected by sensors of the car and analyzed to measure movement of the safety seat with respect to the car itself and its interior elements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant safety seats will be developed and the scope of the term safety seat is intended to include all such new technologies *a priori*.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A safety seat for a vehicle, comprising:
   a static part attachable to an anchor of a vehicle;
   at least two energy absorption elements mounted on the static part, each designed to absorb a different amount of energy; and
   a dynamic part adapted to accommodate a child and comprising at least one connector which is engaging at least one energy absorption elements, the at least one engaged energy absorption element is adapted to a weight range of a child, so as to absorb impact energy applied on the dynamic part via the static part, thus extending along a longitudinal movement between the static part and the dynamic part, wherein the static part and the dynamic part are included in a seat base, and a seat frame concavely shaped to accommodate a child is connected to the dynamic part;
   wherein the seat frame is detachably connected to the seat base;
   wherein the seat frame comprises the at least one connector and the seat frame is detachably connected to the seat base via the at least one connector.

2. The safety seat of claim 1, wherein the at least one connector includes at least one pin which is inserted into at least one hole of the at least one selected energy absorption element.

3. The safety seat of claim 1, wherein the at least two energy absorption elements include a deformable element.

4. The safety seat of claim 1, wherein the longitudinal movement between the static part and the dynamic part is directed by a longitudinal track connecting the static part and the dynamic part.

5. The safety seat of claim 1, further comprising:
   at least one of an accelerometer and a gyroscope for detecting an impact on the safety seat.

6. The safety seat of claim 1, wherein each of the at least one energy absorption elements is designed to absorb energy by non elastic extension along an axis.

7. The safety seat of claim 1, wherein the at least one energy absorption element is a helical element.

8. A method for selecting energy absorption elements of a safety seat for a vehicle, comprising:
   connecting a seat frame concavely shaped to accommodate a child to a seat base attached to an anchor of a vehicle, the seat base includes at least two energy absorption elements, each having mechanical properties designed to absorb different amount of energy; and
   engaging at least one selected energy absorption element by at least one connector included in the seat frame based on a weight of the child, so at least one selected energy absorption element is absorbing impact energy applied on the seat frame via the seat base;
   a static part attachable to an anchor of a vehicle;
   a dynamic part which is detachably connected to a seat frame, the seat frame is concavely shaped to accommodate a child; and
   at least one energy absorption element connecting between the static part and the dynamic part;
   wherein the seat frame is detachably connected to the seat base;
   wherein the seat frame comprises the at least one connector and the seat frame is detachably connected to the seat base via the at least one connector.

9. A safety seat base for a vehicle, comprising:
   a static part attachable to an anchor of a vehicle;
   a dynamic part which is detachably connected to a seat frame, the seat frame is concavely shaped to accommodate a child; and
   at least one energy absorption element connecting between the static part and the dynamic part;
   wherein the energy absorption element is deformed when absorbing impact energy, thus creating a gap between the static part and the dynamic part which is providing indication of the deformation;
wherein the gap is detected by a sensor selected from a group consisting of a hall sensor, a magnet, a micro-switch, and a fuse.

10. The safety seat of claim 9, wherein the gap is visible to a user.

11. The safety seat of claim 9, wherein an inner part of the gap is marked by color to provide noticeable indication.

12. The safety seat base of claim 9, wherein the energy absorption element can be a plastically deformable absorbing element selected from a group consisting of: an elongated spiral, a crushable column, a rolling torus, an inversion tube, a cutting shock absorber, a slitting shock absorber, a tube-and-die absorber, a rolling absorber, a flattening-tube absorber, a strap bender absorber, a rod bender absorber, a wire bender absorber, a wire-through-platen absorber, a deformable link absorber, an elongating a tube/strap/cable absorber, a tube flaring, a housed coiled cable absorber, a bar-through-die absorber, a hydraulic absorber, and a pneumatic absorber.

13. A safety seat for a vehicle, comprising:
a static part attachable to an anchor of a vehicle;
at least two energy absorption elements mounted on the static part, each designed to absorb a different amount of energy;
a dynamic part adapted to accommodate a child and comprising at least one connector which is engaging at least one energy absorption elements, the at least one engaged energy absorption element is adapted to a weight range of a child, so as to absorb impact energy applied on the dynamic part via the static part, thus extending along a longitudinal movement between the static part and the dynamic part, wherein the static part and the dynamic part are included in a seat base, and a seat frame concavely shaped to accommodate a child is connected to the dynamic part;
at least one digital scale for measuring weight; and
a controller and electronic connector engagement mechanism for selecting one of the at least two energy absorption elements based on weight measurements.

* * * * *